United States Patent
Nakai

(10) Patent No.: US 8,082,079 B2
(45) Date of Patent: Dec. 20, 2011

(54) VEHICLE CONTROL APPARATUS

(75) Inventor: Tomoya Nakai, Toyota (JP)

(73) Assignee: JTEKT Corporation, Osaka-shi (JP)

( * ) Notice: Subject to any disclaimer, the term of this patent is extended or adjusted under 35 U.S.C. 154(b) by 413 days.

(21) Appl. No.: 12/471,929

(22) Filed: May 26, 2009

(65) Prior Publication Data

US 2009/0292454 A1 Nov. 26, 2009

(30) Foreign Application Priority Data

May 26, 2008 (JP) ................................ 2008-136863

(51) Int. Cl.
*F02D 41/06* (2006.01)
*F02N 15/00* (2006.01)

(52) U.S. Cl. ......... 701/41; 701/43; 701/113; 123/179.4; 180/443

(58) Field of Classification Search .................... 701/41, 701/43, 113; 123/179.4; 180/443, 444
See application file for complete search history.

(56) References Cited

U.S. PATENT DOCUMENTS

| | | | | |
|---|---|---|---|---|
| 5,078,225 A | * | 1/1992 | Ohmura et al. | 180/446 |
| 5,416,702 A | * | 5/1995 | Kitagawa et al. | 701/36 |
| 5,790,966 A | * | 8/1998 | Madau et al. | 701/41 |
| 6,390,229 B1 | * | 5/2002 | Kaji | 180/443 |
| 6,922,620 B2 | * | 7/2005 | Augustine et al. | 701/41 |
| 7,202,574 B2 | * | 4/2007 | Jabaji et al. | 307/10.1 |
| 7,571,040 B2 | * | 8/2009 | Murty et al. | 701/41 |
| 2003/0088351 A1 | * | 5/2003 | Augustine et al. | 701/41 |
| 2004/0212351 A1 | * | 10/2004 | Kneifel et al. | 320/149 |
| 2006/0087269 A1 | * | 4/2006 | Iwazawa | 318/432 |
| 2008/0047776 A1 | | 2/2008 | Kobayashi et al. | |
| 2008/0246285 A1 | * | 10/2008 | Asada | 290/40 C |
| 2009/0164068 A1 | * | 6/2009 | Tamai | 701/42 |
| 2009/0260913 A1 | * | 10/2009 | Ito et al. | 180/444 |
| 2009/0292420 A1 | * | 11/2009 | Choi | 701/41 |

FOREIGN PATENT DOCUMENTS

| | | |
|---|---|---|
| EP | 1 650 863 A1 | 4/2006 |
| JP | 2005-271640 | 10/2005 |
| JP | 2006-151335 | 6/2006 |

* cited by examiner

*Primary Examiner* — Stephen K Cronin
*Assistant Examiner* — Arnold Castro
(74) *Attorney, Agent, or Firm* — Oblon, Spivak, McClelland, Maier & Neustadt, L.L.P.

(57) ABSTRACT

In a case where an engine ECU determines that the engine is started (restarted), the engine ECU notifies an EPSECU that cranking is to be performed to start the engine before performing the cranking. When such a notification is received, the EPSECU gradually reduces a current command limit value $I^*\_lim$ and a boost voltage limit value $Vbp\_lim$ before the cranking is started.

12 Claims, 4 Drawing Sheets

VEHICLE CONTROL APPARATUS

INCORPORATION BY REFERENCE

The disclosure of Japanese Patent Application No. 2008-136863 filed on May 26, 2009 including the specification, drawings and abstract is incorporated herein by reference in its entirety.

BACKGROUND OF THE INVENTION

1. Field of the Invention

The invention relates to a vehicle control apparatus that controls the operation of a vehicle engine and an electric power steering (EPS) device.

2. Description of the Related Art

An EPS device using a motor as a drive source has been conventionally used as a power steering device for a vehicle, and because such as a device has a large number of advantages, such as a high degree of layout freedom and small energy consumption, the use thereof has recently expanded to a wide range of vehicle types.

A power source (battery) of such an EPS also serves as a power source of a cell motor that is used for cranking when the engine is started. As a result, the application of an assist force with the EPS has conventionally been stopped when the cranking was performed.

Thus, where the EPS is actuated when the power source voltage is lowered in the course of cranking, an excessive current can be taken out from the battery. A state in which such an excessive service current is generated can be assumed to occur, for example, during abrupt steering or during the maximum steering angle is maintained. As a result, the following problem is encountered: the battery is overdischarged and a state is assumed in which the engine cannot be restarted or a drive circuit or the like is damaged by the inflow of such an excessive current. Accordingly, in order to avoid the occurrence of these problems, the application of assist force with the EPS is stopped in advance when cranking is performed.

However, in recent years, in order to reduce the amount of exhaust gas, the number of vehicles provided with the so-called idling stop function, which causes the engine to stop automatically when the vehicle is stopped, has increased, and in such a vehicle, cranking has to be frequently performed to restart the stopped engine. Furthermore, since the number of events in which the cranking is performed simultaneously with a steering operation increases accordingly, the interruption and re-application of an assist force that occur because the EPS is stopped during cranking create an uncomfortable latent feel in steering.

According to, for example, Japanese Patent Application Publication No. 2005-271640 (JP-A-2005-271640), when the engine is stopped and a steering wheel is operated by a small amount, the power assist control by EPS is continued with a limited motor output. On the other hand, when the engine is stopped and the steering wheel is operated by the large amount, the power assist control is stopped till the engine is restarted. Furthermore, according to Japanese Patent Application Publication No. 2006-151335 (JP-A-2006-151335), when an engine stop is detected, the revolution speed of the EPS drive motor is gradually reduced, and when an engine restart is detected, the revolution speed is gradually increased. By limiting the motor output as described above, the power assist control during cranking is performed, while inhibiting the occurrence of the aforementioned excessive service current, and degradation of the steering feel in this process can be suppressed.

However, although the use of the above-described conventional features results in significant improvement, where these reductions of the motor output are implemented rapidly to obtain the effect quickly, the resultant fluctuations of assist force can degrade the steering feel. Therefore, it is preferred that the reduction of motor output be implemented gradually, but in this case, the possibility of the excessive service current occurring in this process rises, and in this respect there still remains some space for improvement.

SUMMARY OF THE INVENTION

The invention provides a vehicle control apparatus that can continue the application of an assist force with an EPS device and maintain good steering feel even during cranking, while inhibiting the occurrence of excessive service current.

The first aspect of the invention relates to a vehicle control apparatus including: a first control unit that controls an engine of a vehicle and starts the engine by performing cranking based on an electric power supplied from a power source; and a second control unit that controls an operation of an EPS device that applies an assist force to a steering system by using a motor as a drive source and that controls an operation of the motor by generating a drive power to be supplied to the motor on the basis of a power source voltage of the power source. The second control unit generates the drive power so as to cause an actual current value to follow a current command value that corresponds to a target value of the assist power and limits the current command value to a predetermined range. The first control unit outputs a signal that notifies the second control unit that cranking is to be performed before performing the cranking, and the second control unit gradually decreases a first limit value of the current command signal to a second limit value by the time when the cranking is started, when the signal is received.

The second aspect of the invention relates to a vehicle control apparatus including: a first control unit that controls an engine of a vehicle and starts the engine by performing cranking based on an electric power supplied from a power source; and a second control unit that controls an operation of an EPS device that applies an assist force to a steering system by using a motor as a drive source and that controls an operation of the motor by boosting a power source voltage of the power source and generating a drive power to be supplied to the motor. The second control unit limits a boost voltage that is to be obtained by boosting to a predetermined range. The first control unit outputs a signal that notifies the second control unit that cranking to be performed before performing the cranking; and the second control unit gradually decreases a first limit value of the boost voltage to a second limit value by the time when the cranking is started, when the signal is received.

Thus, where the limiting processing that leads to the reduction in motor output is performed rapidly to obtain the effect quickly, the resultant fluctuations of assist force can degrade the steering feel. Therefore, it is desirable that the limiting value be reduced gradually, but the problem resulting therefrom is that the possibility of the excessive service current occurring in this process rises. However, with the above-described configuration, the limiting processing is completed before the cranking is started, thereby making it possible to avoid the occurrence of such a problem. As a result, the application of an assist force with an EPS device can be continued and good steering feel can be maintained even during cranking, while inhibiting the occurrence of excessive service current.

In the first or second aspect, the second control unit may continuously reduce the limit value when the engine is stopped. With the above-described configuration, in a case where the power source voltage decreases because of deterioration of the power source or the like, the excessive service current can occur even when no cranking is performed. With the above-described configuration, even in such a case, the occurrence of the excessive service current can be inhibited and good steering feel can be ensured by gradually performing the reduction thereof.

The second control unit may increase the second limit value after a predetermined time elapses after the engine start. Thus, when the engine is started, the power source voltage gradually rises because the power generated by the alternator (generator) returns to the power source, but a certain time lag exists before the level of power that was before the engine stop is restored. However, with the above-described configuration, the effect of inhibiting the excessive service current can be ensured by waiting for a cancellation of current limit and boost voltage limit for a predetermined time required for the restoration.

According to the above-described aspects, there is provided a vehicle control device that can continue the application of an assist force with an EPS device and maintain good steering feel even during cranking, while inhibiting the occurrence of excessive service current.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
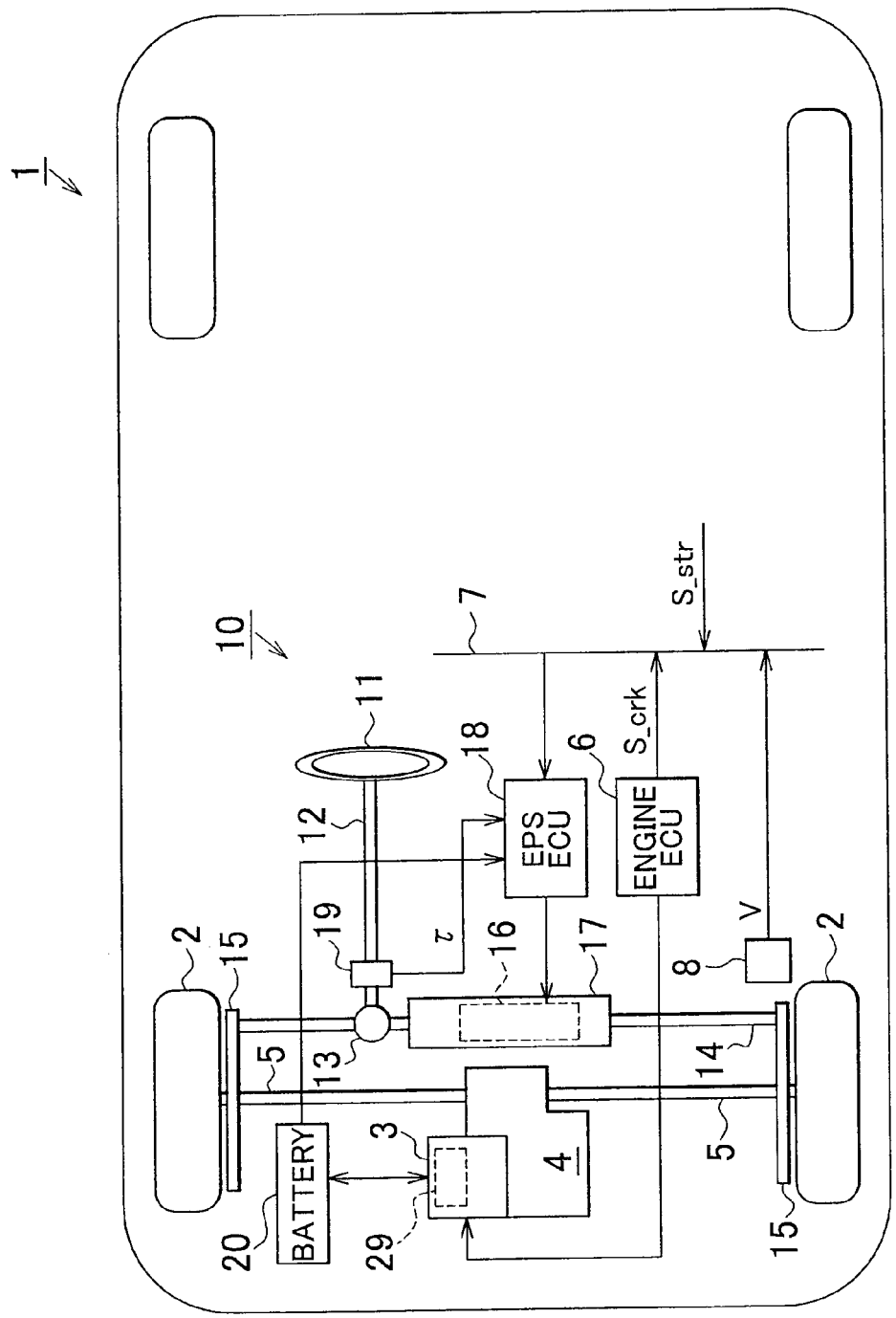
FIG. 1 is a schematic structural diagram of a vehicle.

One embodiment that specifies the invention will be described below with reference to the drawings. As shown in FIG. 1, a vehicle 1 of the embodiment is a car in which front wheels 2 are driven wheels. A pair of front axles 5 are linked to a transaxle 4 assembled with an engine 3, and drive power of the engine 3 is transmitted to the front wheels 2, which are the driven wheels, via the front axles 5. In the embodiment, an engine control unit (ECU) 6 for the engine is connected to the engine 3 that serves as the drive source, and a vehicle speed V detected by a vehicle speed sensor 8, a speed of each wheel, an accelerator depression amount, and an engine start signal S_str are inputted in the engine ECU 6 via an in-vehicle network (CAN: Controller Area Network) 7. Furthermore, in the embodiment, the engine ECU 6 that functions as a first control unit is connected via the in-vehicle network 7 to an electric power steering electronic control unit (EPSECU) 18 that functions as the below-described second control unit and a configuration is obtained in which the two can communicate with each other. The engine ECU 6 controls, based on the state amount of each attribute thus inputted, the operation of the engine 3, including the start thereof. In the vehicle 1 of the embodiment, the engine ECU 6 is provided with the so-called idling stop function of stopping the engine automatically when the vehicle is stopped (and automatically performing the cranking to restart the engine).

The vehicle 1 is provided with an EPS 10 that applies an assist force to a steering system by using a motor as a drive source. More specifically, a steering shaft 12 having a steering wheel 11 fixed thereto is joined to a rack shaft 14 via a rack-and-pinion mechanism 13, and the rotation of the steering shaft 12 that follows the steering operation is converted by the rack-and-pinion mechanism 13 into the reciprocating linear movement of the rack shaft 14. Furthermore, in this configuration, the reciprocating linear movement of the rack shaft 14 that follows the rotation of the steering shaft 12 is transmitted to a knuckle 15 that supports the front wheels 2, whereby a steering angle of the front wheels 2 that are the steered wheels in the embodiment is changed.

The EPS 10 is the so-called rack-type EPS in which a motor 16 that is the drive force thereof is disposed coaxially with the rack shaft 14. An EPS actuator 17 of the EPS is so configured that a motor torque generated by the motor 16 is transmitted to the rack shaft 14 via a ball screw mechanism (not shown in the figure). Furthermore, the EPSECU 18 is connected to the motor 16, and a steering torque $\tau$ detected by a torque sensor 19 that is provided at the steering shaft 12 and a vehicle speed V detected by the vehicle speed sensor 8 are inputted in the EPSECU 18. The EPSECU 18 of the embodiment is so configured as to control the assist force applied to the steering system by controlling the operation of the EPS actuator 17 via the supply of drive power to the motor 16.

Figure 2:
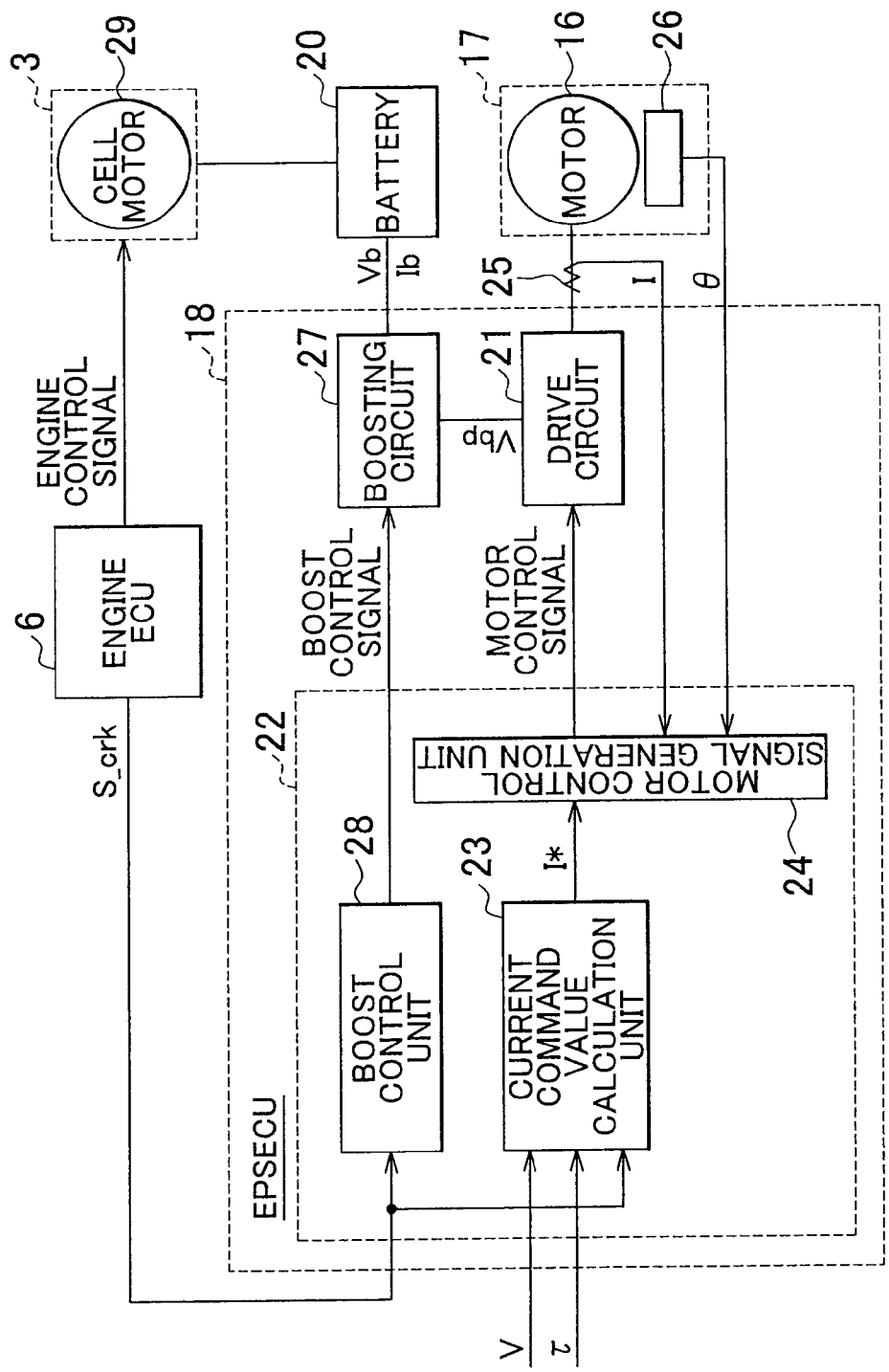
FIG. 2 is a control block diagram of the vehicle.

An electric configuration of the vehicle of the embodiment will be described below. As shown in FIG. 2, the EPSECU 18 is provided with a drive circuit 21 that is disposed in the intermediate section of an electric power supply path between the motor 16, which is the drive source of the EPS actuator 17, and the on-board power source (battery) 20 and that generates drive power to be supplied to the motor 16, and a microcomputer 22 that controls the operation of the drive circuit 21 via the output of motor control signals.

The microcomputer 22 is provided with a current command value computation unit 23 that computes a current command value I* as a control target value of the motor torque, that is, the assist force that will be applied to the steering system on the basis of the steering torque $\tau$ and vehicle speed V, and a motor control signal generation unit 24 that generates a motor control signal on the basis of the current command signal I*.

More specifically, the current command value computation unit 23 computes the current command value I* having a value (absolute value) that increases with the increase in the detected steering torque $\tau$ and decrease in the vehicle speed V. Furthermore, the current command value computation unit 23 has a function of limiting the current command value I* computed based on the steering torque $\tau$ and vehicle speed V to a predetermined range. As a result, the current command value I* outputted by the current command value computation unit 23 is equal to or less than a predetermined limit value (the below-described current command limit value I*_lim).

The current command value I* computed by the current command value computation unit 23 is inputted together with a motor current value I detected by a current sensor 25 and a motor rotation angle $\theta$ detected by the rotation angle sensor 26 in the motor control signal generation unit 24. The motor control signal generation unit 24 then generates a motor control signal by executing a current feedback control so that the motor current value I, which is an actual current value, follows the current command value I* computed by the current command value computation unit 23.

In the EPSECU 18, a boost circuit 27 that boosts a power source voltage Vb and outputs a boost voltage is provided between the on-board power source 20 and the drive circuit 21, and the boost voltage Vbp that is obtained by boosting in the boost circuit 27 is inputted in the drive circuit 21. Furthermore, in the embodiment, the microcomputer 22 is provided with the above-described current command value computation unit 23 and motor control signal generation unit 24 and also a boost control unit 28, and the operation of the boost circuit 27 is controlled by a boost control signal outputted by the microcomputer 22. The drive circuit 21 is so configured that drive power based on the boost voltage Vbp is outputted to the motor 16 in response to the inputted motor control signal. In the embodiment, the boost control unit 28 also has a function of limiting the boost voltage Vbp to a predetermined range. The boost circuit 27 has a configuration such that the operation thereof is controlled within a range in which the boost voltage Vbp outputted thereby does not exceed a predetermined limit value (the below-described boost voltage control value Vbp_lim).

The on-board power source 20 is connected to a cell motor 29 provided at the engine 3. The engine ECU 6 is configured to perform the cranking of the engine 3 by actuating the cell motor 29 on the basis of electric power supplied from the on-board power source 20, the cell motor 29 of the embodiment has a function of an alternator (generator). The electric power generated during engine operation is returned to the on-board power source 20.

Figure 3:
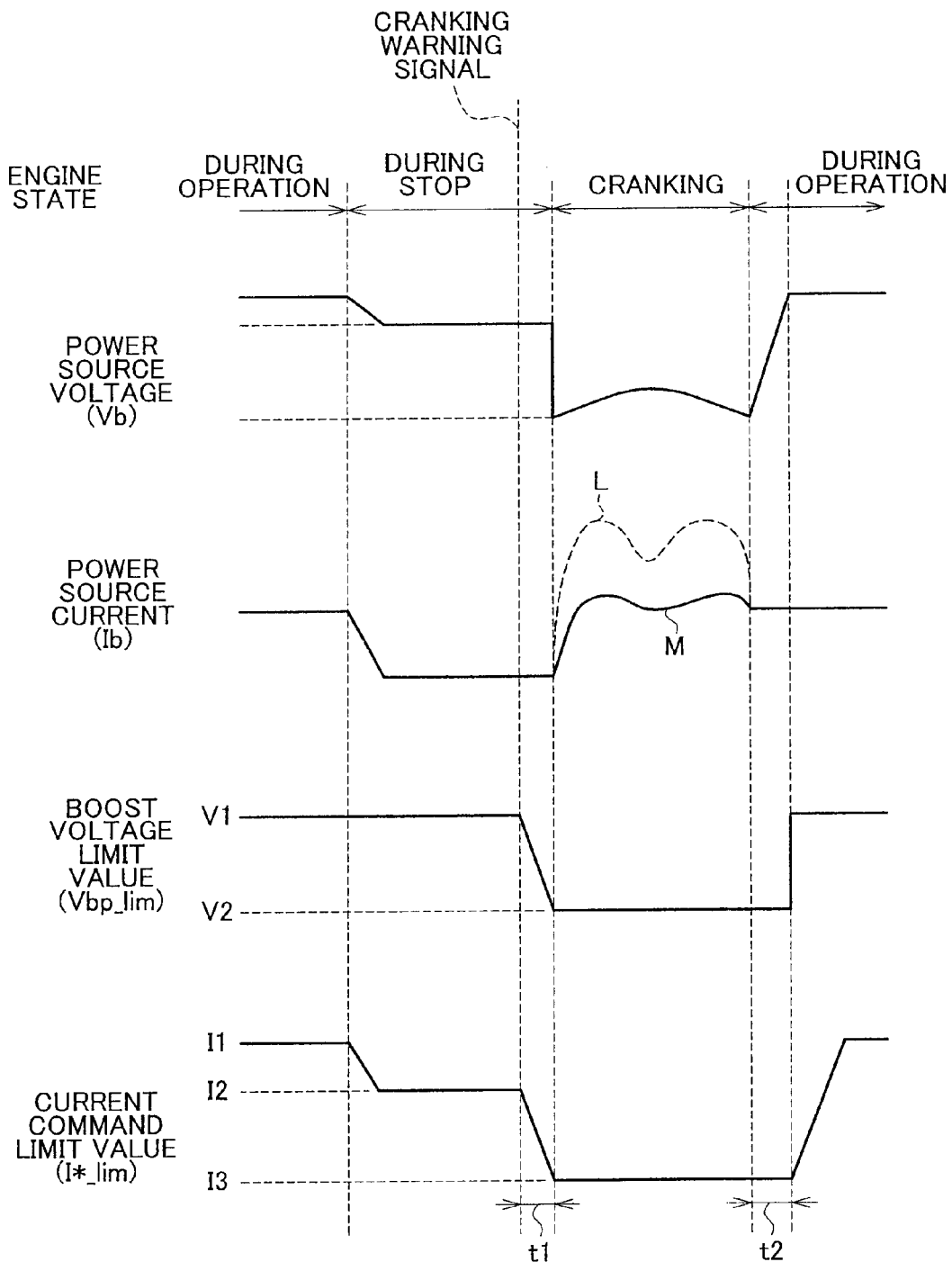
FIG. 3 is an explanatory drawing illustrating a mode of power assist control during engine stop/restart.

(Power Assist Control During Engine Stop/Restart) A mode of power assist control during engine stop/restart will be described below. As shown in FIG. 3, the power source voltage Vb of the on-board power source 20 is decreased by a voltage for the alternator generating the power when the engine is stopped, and then drops more significantly during cranking performed to restart the engine. In this case where power assist control is performed by the EPS 10, an excessive service current such as shown by a broken line L in the figure can be generated. As a result, the following problem is encountered: the battery is overdischarged and the engine may not be restarted or, for example, a drive circuit may be damaged by the inflow of such an excessive current.

With consideration for this issue, in the embodiment, when the engine is stopped, the EPSECU 18 continuously reduces the current command limit value I*_lim thereof, thereby inhibiting the generation of the excessive service current. Thus, in a case where the power source voltage Vb decreases due, for example, to deterioration of the on-board power source 20, the excessive service current can occur even when no cranking is performed. Therefore, a configuration is employed in which the generation of the excessive service current is inhibited by reducing the current command limit value I*_lim in advance, and because this reduction is performed gradually, good steering feel is ensured.

Furthermore, in the embodiment, in a case where the engine ECU 6 determines that the engine 3 is started (restarted), the engine ECU 6 sends beforehand a notification that cranking is to be performed to start the engine 3 before performing the cranking. When such a notification is received, the EPSECU 18 reduces continuously the current command limit value I*_lim and boost voltage limit value Vbp_lim before the cranking is started, thereby inhibiting the generation of the excessive service current (see FIG. 3, continuous line M).

In the embodiment, the notification that cranking will be executed is performed by outputting a cranking warning signal S_crk (see FIGS. 1 and 2), and the engine ECU 6 starts cranking the engine 3 after a predetermined time t1 elapses after the output of the cranking warning signal S_crk. The EPSECU 18 is configured to reduce continuously the current command control value I*_lim from "I2" to "I3" and the boost voltage limit value Vbp_lim from "V1" to "V2" within the predetermined time t1 after the reception of the cranking warning signal S_crk.

Thus, where the limit values of the current limit and boost voltage limit are decreased rapidly to obtain the effect thereof quickly, the resultant fluctuations of assist force can degrade the steering feel. Therefore, it is desirable that the reduction of current command limit value and boost voltage limit value be performed gradually. The problem resulting therefrom is that the possibility of the excessive service current being generated within this process increases.

However, the occurrence of this problems can be avoided by reducing the current command limit value I*_lim and boost voltage limit value Vbp_lim continuously in advance before the cranking is started. Furthermore, in the embodiment, a configuration is thus obtained in which the application of an assist force with an EPS device is continued and good steering feel is maintained even during cranking, while inhibiting the occurrence of excessive service current.

Furthermore, the EPSECU 18 of the embodiment increases the current command limit value I*_lim and boost voltage limit value Vbp_lim that have been reduced prior to the cranking start from "I3" to "I1" and from "V2" to "V1", respectively, after a predetermined time t2 elapses after the engine start.

Thus, when the engine is started, the power source voltage Vb gradually rises because the electric power generated by the alternator (generator) returns to the on-board power source 20, but a certain time lag exists before the level of power that was before the engine stop is restored. Therefore, in the embodiment, a configuration is used in which the effect of inhibiting the excessive service current is ensured by waiting for a cancellation of the current limit and boost voltage limit for a predetermined time t2 required for the restoration.

Figure 4:
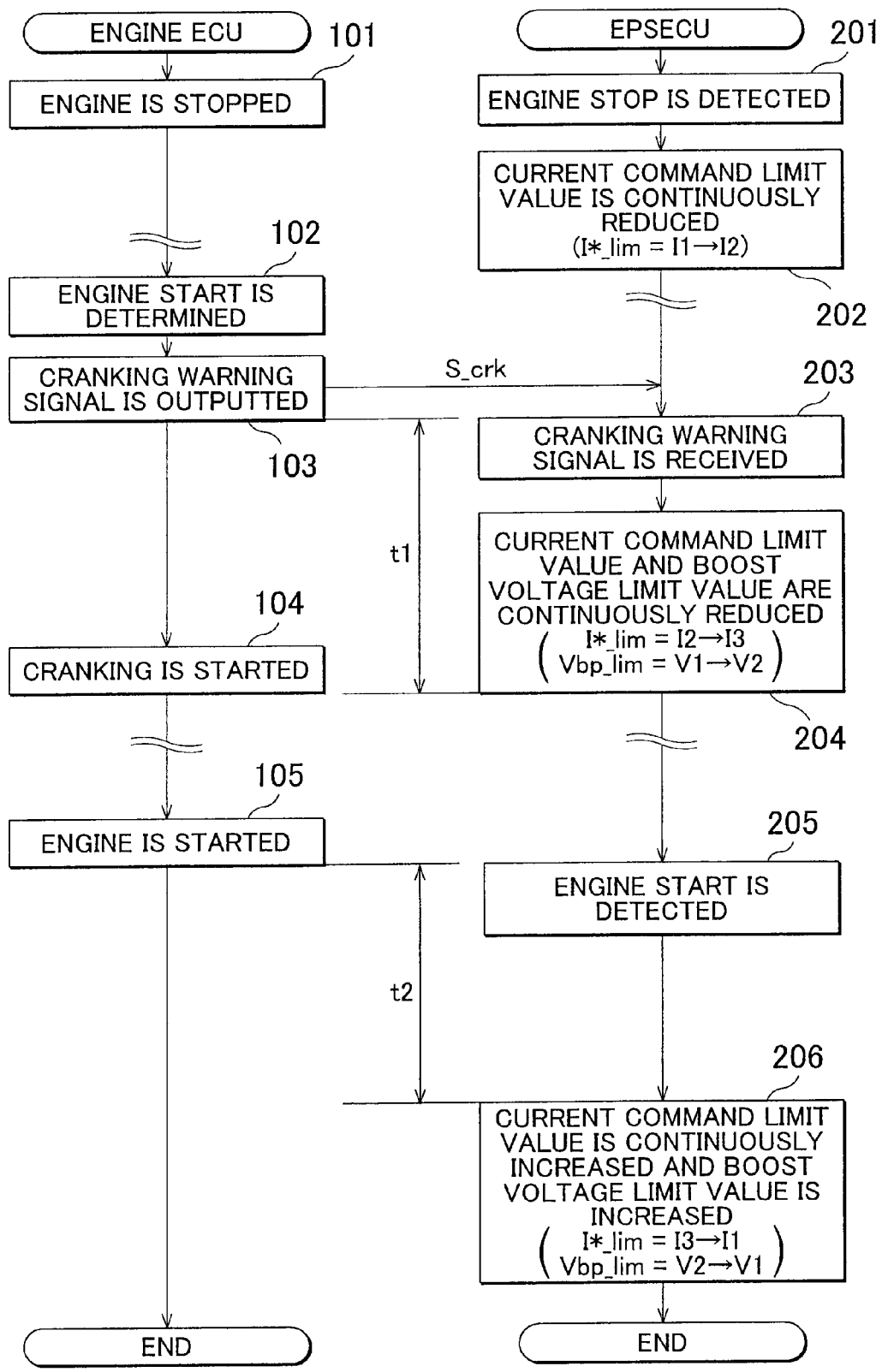
FIG. 4 is a flowchart illustrating a processing procedure of power assist control during engine stop/restart.

A processing procedure of power assist control during engine stop/restart of the above-described configuration will be explained below. As shown in a flowchart in FIG. 4, where the EPSECU 18 detects (step 201) the stop (step 101) of the engine 3 by the engine ECU 6, the EPSECU 18 continuously decreases the current command limit value I*_lim thereof (I1→I2, step 202).

Where the engine ECU 6 determines the start (restart) of the engine 3 (step 102), the engine ECU 6 outputs the cranking warning signal S_crk (step 103), and the EPSECU 18 receives the cranking warning signal S_crk (step 203) and continuously reduces the current command limit value I*_lim and boost voltage limit value Vbp_lim (I2→I3, V1→V2, step 204). The engine ECU 6 then starts the cranking (step 104) required to start the engine 3 after the predetermined time t1 that has been set in advance as the time required to reduce the current command limit value I*_lim and boost voltage limit value Vbp_lim.

In a case where the EPSECU 18 detects (step 205) the start of the engine 3 by the engine ECU 6 (step 105), the EPSECU 18 increases the current command limit value I*_lim and boost voltage limit value Vbp_lim after the predetermined time t2 elapses (step 206). The EPSECU 18 of the embodiment is configured to increase the current command limit value I*_lim continuously from "I3" to "I1" and raise the boost voltage limit value Vbp_lim from "V2" to "V1" in a stepwise manner.

The following interaction/effect can be obtained with the embodiment.

(1) In a case where the engine ECU 6 determines the start (restart) of the engine 3, the engine ECU 6 notifies the EPS-ECU 18 that the cranking is to be performed to start the engine before performing the cranking. When the notification is received, the EPSECU 18 continuously reduces the current command limit value I*_lim and boost voltage limit value Vbp_lim before the cranking is started.

Thus, where the limit values of the current limit and boost voltage limit are decreased rapidly to obtain the effect thereof quickly, the resultant fluctuations of assist force can degrade the steering feel. Therefore, it is desirable that the reduction of current command limit value and boost voltage limit value be performed gradually. The problem resulting therefrom is that the possibility of the excessive service current being generated within this process increases. However, with the above-described configuration, the limiting processing is completed before the cranking is started, thereby making it possible to avoid the occurrence of such a problem. As a result, the application of an assist force with an EPS device can be continued and good steering feel can be maintained even during cranking, while inhibiting the occurrence of excessive service current.

(2) When the engine is stopped, the EPSECU 18 continuously reduces the current command limit value I*_lim thereof. Thus, with the above-described configuration, in a case where the power source voltage Vb decreases because of deterioration of the on-board power source 20 or the like, the excessive service current can occur even when no cranking is performed. With the above-described configuration, even in such a case, the occurrence of the excessive service current can be inhibited and good steering feel can be ensured by gradually performing the reduction thereof.

(3) The EPSECU 18 increases the current command limit value I*_lim and boost voltage limit value Vbp_lim that have been reduced before the cranking is started after the predetermined time t2 elapses after the engine start.

Thus, when the engine is started, the power source voltage Vb gradually rises because the electric power generated by the alternator (generator) returns to the on-board power source 20, but a certain time lag exists before the level of power that was before the engine stop is restored. However, with the above-described configuration, the effect of inhibiting the excessive service current can be ensured by waiting for a cancellation of current limit and boost voltage limit for the predetermined time t2 required for the restoration.

The embodiment may be modified as described below.

In the embodiment, the current command limit value I*_lim and boost voltage limit value Vbp_lim are reduced continuously before the cranking is started. However, this feature is not limiting, and a configuration may be used in which only either of the current limitation and boost voltage limitation is performed. Therefore, the invention may be also applied to a configuration having no voltage boosting function. However, because the occurrence of the excessive service current is especially significant in the EPS having the voltage boosting function, it goes without saying that the maximum effect for the configuration having the voltage boosting function is obtained by performing both the current limitation and the boost voltage limitation.

In the embodiment, the configuration is such that when the engine is stopped, the EPSECU 18 continuously reduces the current command limit value I*_lim, but a configuration in which the boost voltage limit value Vbp_lim is also reduced continuously may be used.

In the embodiment, the configuration is such that the current command limit value I*_lim is continuously increased from "I3" to "I1" and the boost voltage limit value Vbp_lim is raised from "V2" to "V1" in a stepwise manner, but a configuration in which the boost voltage limit value Vbp_lim is increased continuously may be also used.

In the embodiment, the configuration is such that the current command limit value I*_lim and boost voltage limit value Vbp_lim are reduced continuously, but they may be also reduced in a stepwise manner, provided that the steering feel changes gradually.

What is claimed is:

1. A vehicle control apparatus comprising:
a first control unit that controls an engine of a vehicle and starts the engine by performing cranking based on an electric power supplied from a power source; and
a second control unit that controls an operation of an electric power steering device that applies an assist force to a steering system by using a motor as a drive source, and that controls an operation of the motor by generating a drive power to be supplied to the motor on the basis of a power source voltage of the power source, the second control unit generating the drive power so as to cause an actual current value to follow a current command value that corresponds to a target value of the assist power, and the second control unit limiting the current command value to a predetermined range, wherein
the first control unit outputs a signal that notifies the second control unit that cranking is to be performed before performing the cranking, and
the second control unit gradually decreases a first limit value of the current command signal to a second limit value by the time when the cranking is started, when the signal is received.

2. The vehicle control apparatus according to claim 1, wherein the second control unit continuously reduces the current command value from the first limit value to the second limit value.

3. The vehicle control apparatus according to claim 1, wherein the second control unit reduces the current command value from the first limit value to the second limit value in a stepwise manner.

4. The vehicle control apparatus according to claim 1, wherein the second control unit gradually reduces the first limit value to a third limit value that is larger than the second limit value, when the engine stop is detected.

5. The vehicle control apparatus according to claim 1, wherein the second control unit increases the second limit value after a predetermined time elapses since the start of the engine.

6. The vehicle control apparatus according to claim 5, wherein the second control unit increases continuously the second limit value to the first limit value.

7. A vehicle control apparatus comprising:
a first control unit that controls an engine of a vehicle and starts the engine by performing cranking based on an electric power supplied from a power source; and
a second control unit that controls an operation of an electric power steering device that applies an assist force to a steering system by using a motor as a drive source, and that controls an operation of the motor by boosting a power source voltage of the power source and generating a drive power to be supplied to the motor, the second control unit limiting a boost voltage to be obtained by boosting to a predetermined range, wherein
the first control unit outputs a signal that notifies the second control unit that cranking is to be performed before performing the cranking, and the second control unit gradually decreases a first limit value of the boost voltage to a second limit value by the time when the cranking is started, when the signal is received.

8. The vehicle control apparatus according to claim 7, wherein the second control unit continuously reduces the boost voltage from the first limit value to the second limit value.

9. The vehicle control apparatus according to claim 7, wherein the second control unit reduces the boost voltage from the first limit value to the second limit value in a stepwise manner.

10. The vehicle control apparatus according to claim 7, wherein the second control unit gradually reduces the first limit value to a third limit value that is larger than the second limit value when the engine stop is detected.

11. The vehicle control apparatus according to claim 7, wherein the second control unit increases the second limit value after a predetermined time elapses since the start of the engine.

12. The vehicle control apparatus according to claim 11, wherein the second control unit increases, in one step, the second limit value to the first limit value.

* * * * *